Patented Mar. 2, 1954

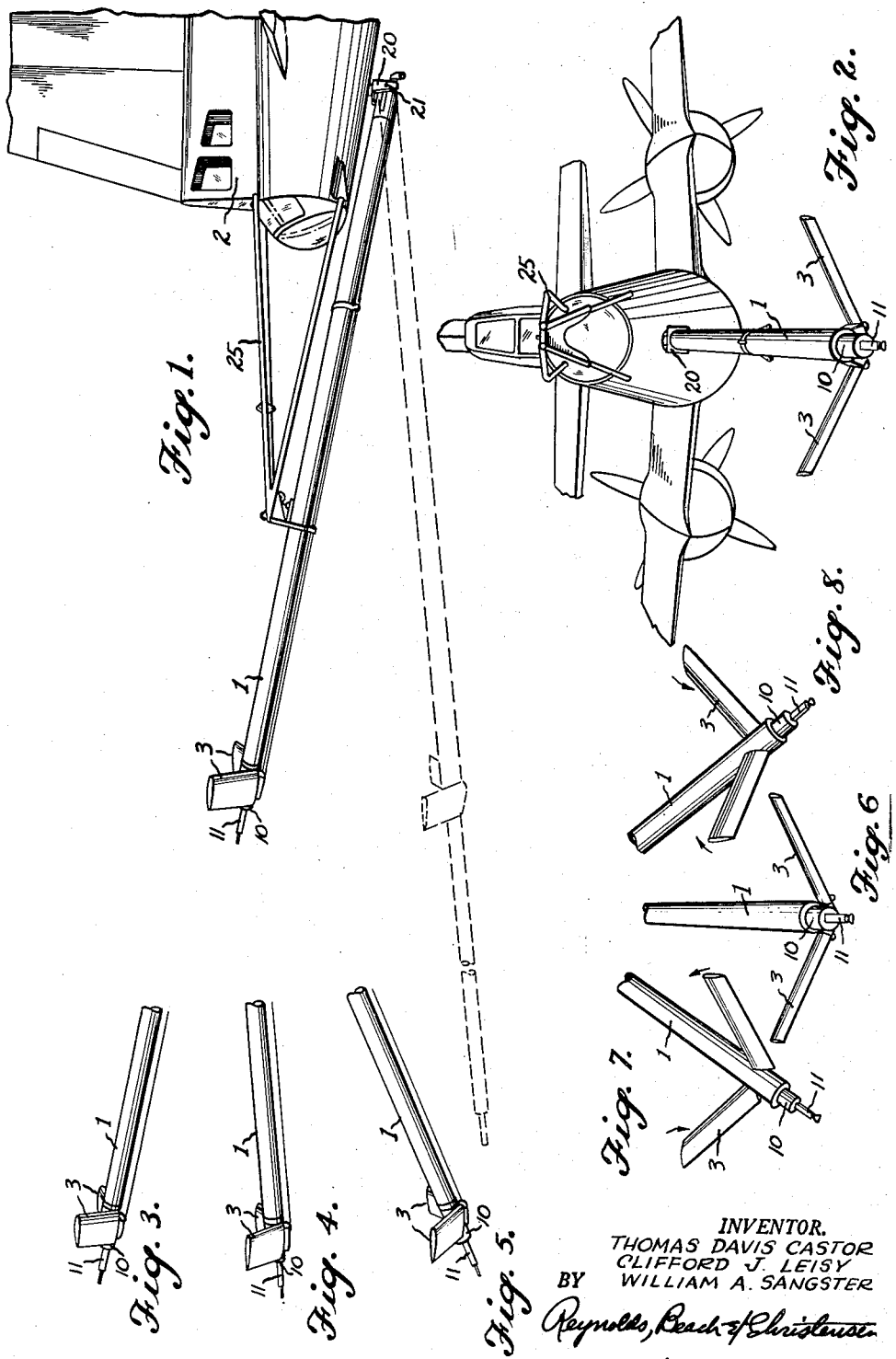

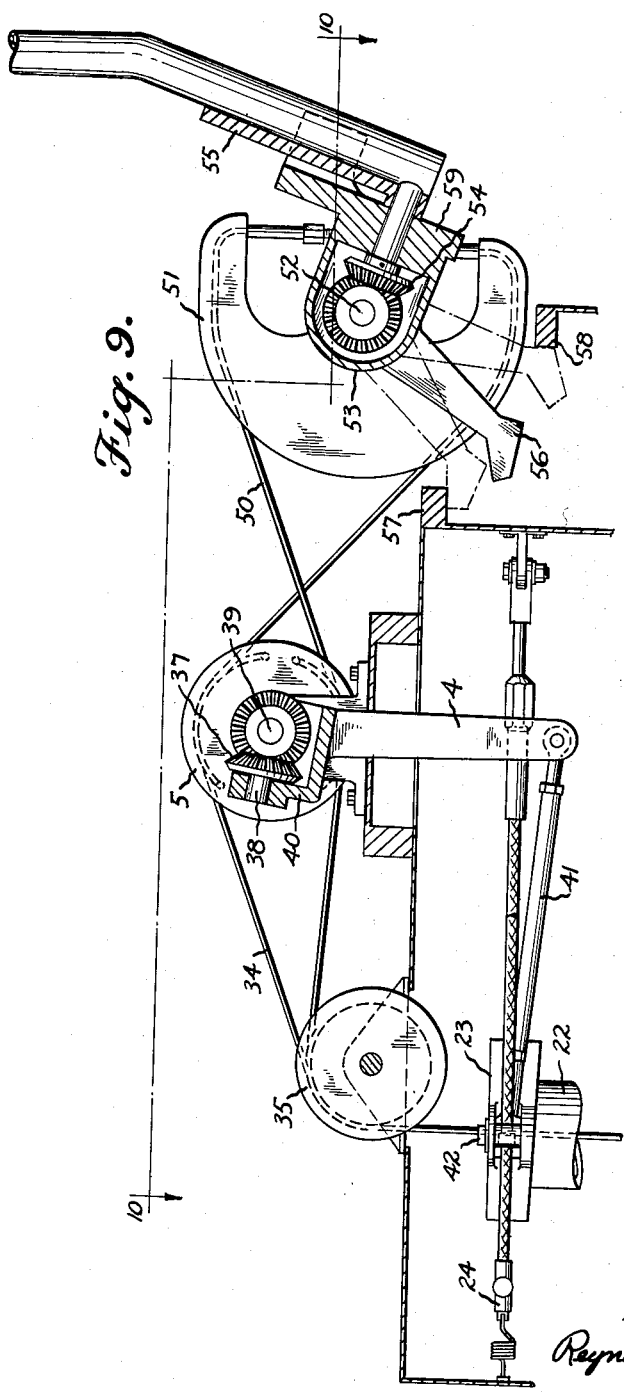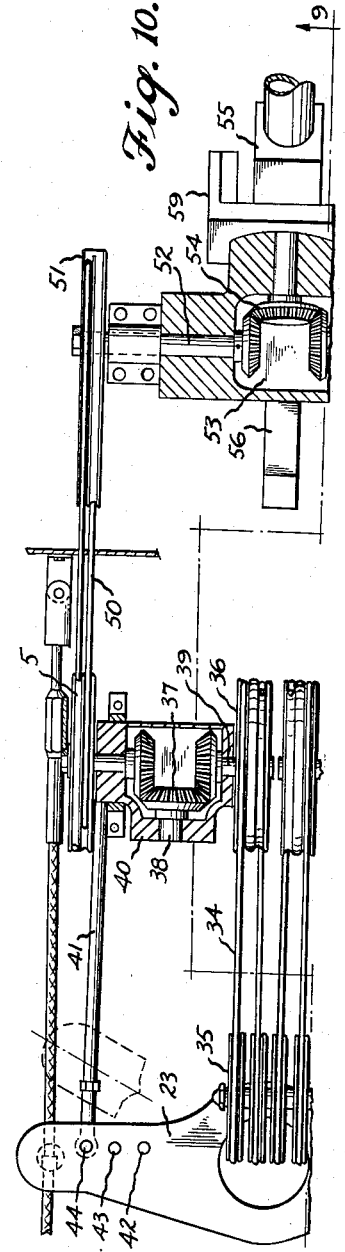

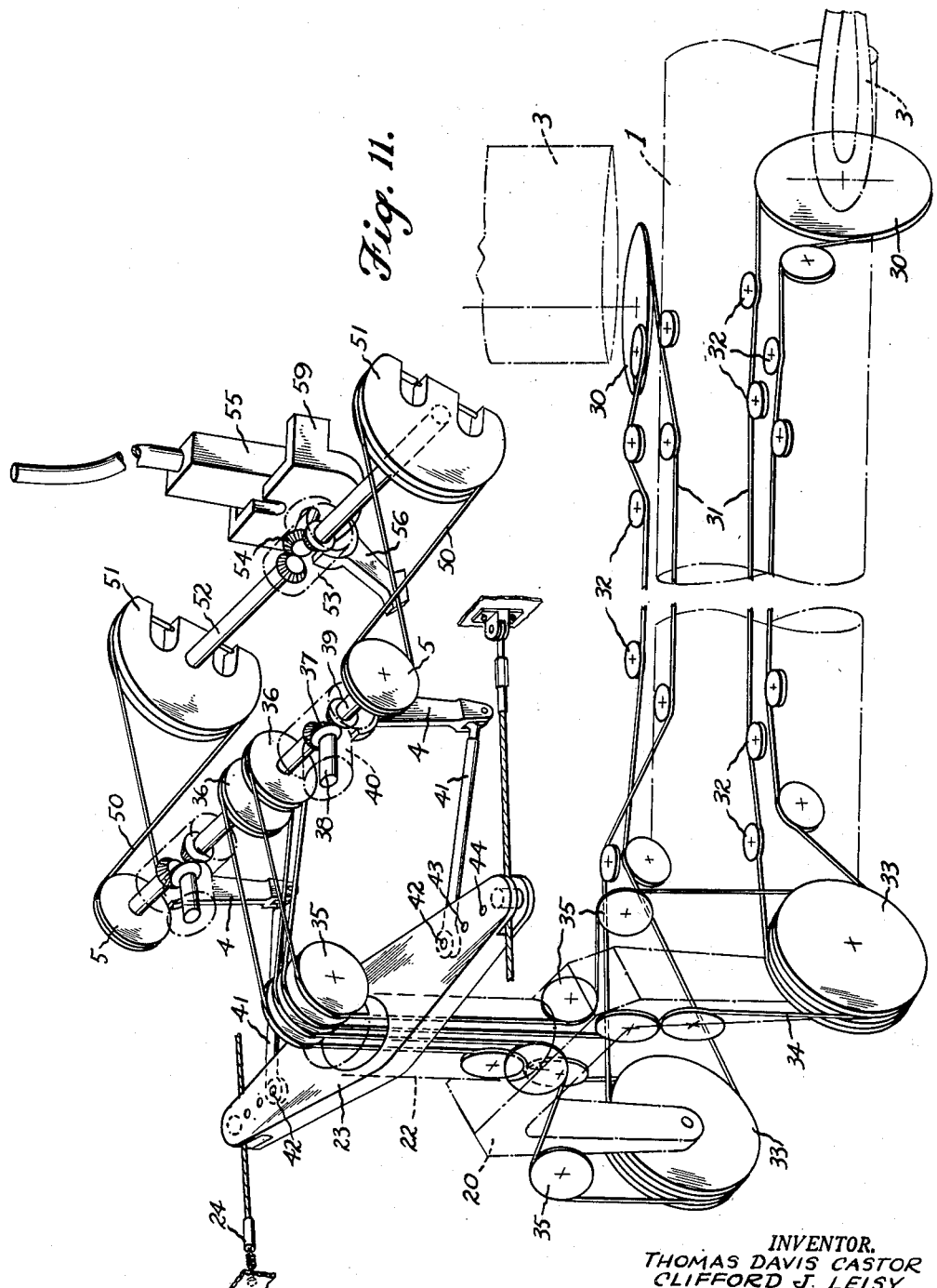

2,670,913

UNITED STATES PATENT OFFICE 2,670,913

AIRCRAFT BOOM CONTROL AND BALANCING MECHANISM

Thomas Davis Castor and Clifford J. Leisy, Seattle, and William A. Sangster, Mercer Island, Wash., assignors to Boeing Airplane Company, Seattle, Wash., a corporation of Delaware Application April 24, 1950, Serial No. 157,822

21 Claims. (Cl. 244—135)

This invention pertains to apparatus intended primarily for transferring fuel from one airplane to another in flight and is directed especially to apparatus on the tanker airplane. The apparatus is of the same general type as that disclosed in the co-pending application of Leisy, Serial No. 108,070, filed August 2, 1949.

Both in the present apparatus and in that disclosed in the aforesaid co-pending application, a boom was carried beneath the rear portion of the tanker airplane and was controllable for both vertical and lateral swinging of its trailing end so that it could be moved universally for contact with receiving apparatus on the receiving airplane. In addition, the boom was of telescoping construction so that it could be lengthened or shortened, as desired, to make contact with the receiving airplane. The boom was hollow, enabling fuel or other material to be transferred through the boom from the tanker or supply airplane to the receiving airplane, after the boom had been suitably connected to the receiving airplane.

The present invention is utilized in an aircraft interconnecting, material transfer system of this general type, and is directed particularly to aerodynamic control of the boom both prior to and during contact of the aft end of the boom with the receiving airplane. Specifically, it is an object of the present invention to provide a unique aerodynamic control for the boom which will enable its manipulation into various positions prior to being connected with the receiving airplane and which, in addition, will reduce aerodynamic forces on the boom when displaced from a given position, whether before or after it has been connected to the receiving airplane.

Especially it is an object to control automatically air reaction surfaces while the boom is connected to a receiving airplane so that, despite variations in the relative positions of the airplanes, whether vertically or laterally, the boom will exert only such force transversely of its length on the receiving airplane as may be desired, or will produce no increased lateral force on the receiving airplane as the airplanes move relatively.

It is a further object to provide such an automatic control of the boom by operation of its air reaction surfaces, while at the same time preserving the effectiveness of the manual control so that the boom operator may at any time override the automatic operation of the air reaction surfaces to produce a force on the boom acting in any direction transversely of its length.

An additional object of the invention is generally to simplify the aerodynamic control mechanism for the boom and the nature and arrangement of the air reaction surfaces themselves.

More specifically, a feature of the invention is to utilize, preferably, only two air reaction surfaces, projecting generally horizontally from opposite sides of the trailing portion of the boom and having a considerable dihedral angle so that an upright control surface is unnecessary. Such control surfaces then fulfill the function of both the rudder and the elevators, and may be designated ruddevators, the boom empennage, as a whole, being of the V tail type.

In employing such a ruddevator type of boom control it is a feature to interconnect the two ruddevators by balancing mechanism which will pivot them conjointly relative to the boom so that, as the boom rises or falls, both ruddevators will be tilted relative to the boom in the same direction to maintain their angle of attack approximately constant despite vertical movement of the boom, and which will effect conjoint differential or opposite pivoting of the ruddevators as the boom swings laterally. Depending upon the design of the balancing mechanism, the boom may be allowed to float either vertically or laterally at will without the empennage exerting any appreciable restoring force except as the control surfaces may be moved by the pilot. Alternatively, the control surfaces may be balanced to exert a predetermined amount of restoring force when the boom swings vertically out of a given position, or when the boom swings laterally out of a given position, or both.

The balancing mechanism generally is of the parallel motion type, although the proportion of the parts may be selected to give a disproportionate motion. As the boom swings vertically relative to the longitudinal axis of the fuselage the balancing mechanism will effect movement of the ruddevators relative to the boom through an angle equal to the angle of boom movement and in a direction such that the chords of the ruddevators will maintain approximately the same angle relative to the longitudinal axis of the airplane fuselage. Such movement allows the free floating of the boom so that the boom motion produced by the ruddevators in a vertical direction is entirely under the control of the boom operator.

Alternatively, the motion transmission mechanism may be proportioned so that as the boom swings vertically relative to the airplane fuselage the angular movement of the ruddevators relative to the boom will be less than the angular movement of the boom itself, to produce a restoring force on the boom tending to return it to the vertical position from which it was displaced.

Likewise, the balancing control mechanism will turn the ruddevators in opposite directions as the boom swings laterally, so that, for a given angle of lateral displacement, the ruddevators will be turned through such an angle as will tend to maintain the boom in such laterally swung position in opposition to the air load on the boom. The proportions of parts of the mechanism may be selected so that the ruddevators will be turned through a lesser angle for a given lateral angle of boom swing relative to the central vertical plane of the airplane than is necessary to offset the air load on the boom, in which case a greater or lesser restoring force will be exerted on the boom tending to return it to its initial position.

By properly designing the balancing mechanism, any degree of restoring force, either vertically or laterally, may be produced automatically by the angular adjustment of the ruddevators effected by such mechanism. It is an important feature of that mechanism, however, that it is integrated with the manual control mechanism which may be manipulated by the operator so that control movement of the ruddevators in any degree he may desire may, at any time, be superimposed upon the automatic regulation of these surfaces.

Further advantages of the particular type of automatic balancing mechanism shown in the accompanying drawings will be pointed out in the following specification.

Figure 1 is a side elevational view of the tail portion of a supply airplane showing the boom in stored position in full lines and in a lowered and extended position in broken lines.

Figure 2 is a rear elevation of the aft fuselage portion of the airplane showing the boom in full lines in lowered position.

Figure 3 is a fragmentary side elevational view of the boom's trailing end shown in raised position, while Figure 4 is a similar view showing the boom in slightly lowered position, and Figure 5 is a similar view showing the boom in a further lowered position.

Figure 6 is a rear elevational view of the trailing end of the boom disposed substantially in the central plane of the airplane fuselage, while Figure 7 is a similar view showing the boom swung to port and Figure 8 is a similar view showing the boom swung to starboard.

Figure 9 is a side elevational view taken on line 9—9 of Figure 10 of a portion of the control mechanism integrated with the automatic balancing mechanism, and Figure 10 is a plan view of this mechanism taken on line 10—10 of Figure 9.

Figure 11 is a somewhat diagrammatic top perspective view of the integrated control mechanism and automatic balancing mechanism as applied to the boom and its mounting structure.

As has been explained in the aforementioned companion application, Serial No. 108,070, a telescoping boom composed of an outer section 1 and a longitudinally reciprocable inner section 10 is used to interconnect a supply aircraft and a receiving aircraft.

Preferably the outer boom section has its forward end carried by the trailing end of the supply aircraft and disposed beneath it, such as the forward end of such boom element being pivoted in a yoke 20 on trunnions 21, which yoke, in turn, is mounted for rotation about an upright axis on a hollow shank 22. The trailing end of the boom may thus swing vertically on the trunnions 21 and the trailing end of the boom may swing laterally by turning of the yoke shank 22 in its mounting.

While vertical swinging of the boom about trunnions 21 may be limited, and lateral swinging of the boom may be limited by restricting turning of yoke 20, such as by engagement of its cross arms 23 with stops 24, the trailing end of the boom will have universal movement of considerable amplitude. Upward movement of the boom will be sufficient to enable it to be secured in the hanger 25 projecting from the tail of the airplane fuselage as shown in Figures 1 and 2. The length of the boom may be adjusted within considerable limits by extension of the inner element 10 of the telescoping tube assembly, and when proper contact is made with a receiving airplane the boom's trailing end may be connected to such receiving airplane by a suitable nozzle 11.

In utilization of a boom interconnecting two aircraft for transfer of material from one to the other, of the type generally described above, two problems arise; first, that of manipulating the trailing end of the boom into the proper position vertically and laterally, to establish contact with the airplane to be connected to the boom's trailing end, and second, after such contact has been established, to prevent the boom exerting excessive loads on the aircraft to which its trailing end is attached, produced by relative vertical or lateral movement of the aircraft.

In thus manipulating the trailing end of the boom prior to connection of its trailing end with the other aircraft, it is desirable for the boom to have as much inherent stability as possible so that when the controls are moved to swing the boom into a particular attitude to its supporting aircraft, whether vertically or laterally, the boom will tend to remain in that position despite air loads produced on it. A boom having these characteristics could be positioned wherever desired with minimum control manipulation by the boom operator. On the other hand, after the trailing end of the boom has been connected to the receiving airplane, it would be preferable for the boom control surfaces to be moved automatically so that the aerodynamic forces on the boom would be balanced in every swung position, and consequently the boom would not exert any force on the airplane to which its trailing end is connected.

Because the desirable characteristics of boom control prior to and subsequent to the boom coupling operation are diametrically opposite, some compromise between these two types of operation ordinarily will be preferable. With the automatic balancing mechanism described below any desired operation between these two types is possible.

As has been explained in the co-pending application of Leisy, Serial No. 108,070, it is preferred that manipulation of the boom, both vertically and laterally, be accomplished by aerodynamic controls. Preferably these are in the form of a V tail on the rear portion of the boom composed of two combination elevators and rudders 3, designated ruddevators. The rudder action is accomplished by the horizontal components of the lift forces on these surfaces when the angle of incidence of one ruddevator is increased and that of the other is decreased simultaneously. During such movement the changes in the vertical components of the lift on the two ruddevators occur in opposite senses and approximately balance each other, whereas the horizontal components are additive toward the ruddevator whose angle of incidence is decreased. Elevational forces are produced on the boom by tilting both ruddevators simultaneously and equally either to increase or decrease their angle of incidence. The desired effect of the automatic balancing mechanism is illustrated in Figures 3, 4 and 5. Figure 4 shows the boom inclined slightly downward, such as might be the attitude produced by the balance between the weight of the boom and the load of the air on it caused by movement of the airplane. The ruddevators are at zero angle of attack, but, because of their shape, produce some aerodynamic lift to assist the air load in raising the boom.

If the boom should be subjected to a sudden updraft of air its trailing end might be displaced into the position shown in Figure 3, but the automatic balancing mechanism would rotate the ruddevators through an angle approximately equal to the angle of boom displacement so that they would still have zero angle of attack. Conversely, if the boom should be subjected to a sudden downward air load, so that it was displaced into the position shown in Figure 5, the angle of incidence of the ruddevators would be reduced, again to maintain their angle of attack unchanged. In neither case, therefore, would the ruddevators exert any restoring force to move the boom back to the position of Figure 4. On the contrary, upon cessation of the upward air load or downward air load, the normal air load would be restored, which would be the only automatic force acting to return the boom to the position of Figure 4. For that reason the boom might tend to hunt considerably unless its return to the position of Figure 4 were expedited by the boom operator swinging the ruddevators to produce a restoring force. This action would be the same, of course, if the displacement were caused by some peculiar air load whether on the boom itself or on an aircraft connected to the trailing end of the boom.

Figures 6, 7 and 8 illustrate the balancing adjustments of the ruddevators necessary to prevent the production of an aerodynamic restoring force, or greatly reduce it, if a side air load should swing the boom laterally from its central position. The effect of swinging the trailing end of the boom to port from the position of Figure 6 to that of Figure 7 is to increase the angle of attack of the port ruddevator and to decrease the angle of attack of the starboard ruddevator. Consequently, the composite effect of such changes in angle of attack is for the ruddevators to produce an aerodynamic force tending to swing the trailing end of the boom back to the central position. In order to eliminate such effects of the ruddevators, the automatic balancing mechanism is controlled by rotation of the yoke 20 as it swings to decrease the angle of incidence of the outboard ruddevator and to increase the angle of incidence of the inboard ruddevator so that no, or at least less, restoring force will be produced by the ruddevators.

It will be evident that this change in angle of incidence of the two ruddevators should be accomplished simultaneously and equally in degree, and that such change must increase progressively as the displacement angle of the boom increases in order to avoid production of a restoring aerodynamic force, or to maintain constant the relationship between such a restoration force and the angle of boom swing. Thus in Figure 7 the angle of incidence of the port ruddevator is decreased and the angle of incidence of the starboard ruddevator is increased as the boom is swung to port, and, conversely, in Figure 8 the angle of incidence of the starboard ruddevator is decreased, and of the port ruddevator is increased as the boom is swung to starboard.

If the ruddevators are thus swung differentially to eliminate aerodynamic restoring force produced by them, the only restoring force which will act on the boom is the air load on the boom itself. Indeed, even such air load may, if desired, be counteracted by providing sufficient alteration in the angle of incidence of the ruddevators. On the contrary, if some aerodynamic restoring force is desired, the change in angle of incidence of the ruddevators will be less than that required to eliminate completely the aerodynamic restoring force.

Having in mind the type of ruddevator control and balancing action desired, attention is directed to Figures 9, 10 and 11, illustrating the manually operated control mechanism integrated with the automatic balancing mechanism to adjust the angle of incidence of the ruddevators conjointly, either in the same direction for elevational control, or in opposite directions for lateral control of the aerodynamic forces acting on the boom.

Figure 11 shows in broken lines the boom 1 carrying the ruddevators 3 and itself carried by the yoke 20. The mechanism operable to adjust the angle of incidence of the ruddevators is shown diagrammatically superimposed upon this structure, but it will be understood that ordinarily such operating mechanism will be suitably housed and may be arranged in any convenient fashion capable of effecting the operations hereinafter described.

The ruddevator operating mechanism includes two pulleys 30 mounted coaxially with the respective ruddevators, and rotatable to turn the ruddevators relative to the boom 1 for altering their angles of incidence. Over these pulleys pass cables 31 which contact guide pulleys 32 carried by and arranged conveniently along the length of the boom 1 to guide the cables 31 for passage about pulleys 33 journaled on the opposite legs of the yoke 20.

Pulleys 33 are double, one part of each receiving a cable 31 and the other part receiving a cable 34 extending from the pulley 33 up through the tubular shank 22 of the yoke 20 into the interior of the airplane. The cables 34 are guided by guide pulleys 35 carried by the yoke at opposite ends of its shank to direct the cables 34 through it from pulleys 33, and from the upper end of such spindle around drive pulleys 36. These drive pulleys are rotated through differential gear assemblies 37 which are moved both by automatic balancing mechanism and by manual control mechanism.

The automatic balancing mechanism connected with the respective differential gear devices 37 effects the balancing action of the ruddevators during lateral swinging of the boom. The central gear of the differential gear mechanism rotates on a shaft 38 journaled in the housing 40 on an axis disposed perpendicular to the axis of drive pulleys 36 and of the shafts 39 for the gears of the differential gearing not secured to the pulleys 36. The automatic balancing mechanism includes levers 4 secured to the housing 40 of the differential gear mechanism, which levers are connected by links 41 to the opposite arms of the yoke crossbar 23, being secured to such crossbar by pivots 42. This crossbar has additional apertures 43 and 44, for example, in which the pivots 42 of links 41 may be engaged to vary the degree of automatic balancing effect produced by the mechanism, as will be explained.

The control mechanism for the ruddevators includes pulleys 5 secured upon shafts 39. About these pulleys extend cables 50 which are secured to quadrants 51 carried by coaxial shafts 52. These shafts carry opposite gears of a further differential gearing arrangement 53, the intermediate gear 54 of which carries the control column 55. The housing of this differential gearing has a stop arm 56 secured to it to limit the conjoint rotation of shafts 52 in the same direction. This stop arm engages stationary stops 57 and 58 shown in Figure 9. Other stops 59, disposed at opposite sides of control column 55, limits its tilting for effecting rotation of gear 54.

The balancing movement of the ruddevators effected during vertical swinging of the boom as illustrated in Figures 3, 4 and 5, is accomplished by the pulleys 30, cables 31 and pulleys 33. If the control column 55 is not moved, and if the yoke 20 is not turned by lateral swinging of the boom, pulleys 33 will be held stationary by cables 34 and pulleys 36 which would not rotate. If, therefore, pulleys 33 are the same size as pulleys 30, the wrap of cable 31 around the upper portion of pulleys 33 as the boom 1 swings downward will cause both pulleys 30 to rotate counterclockwise, as viewed in Figure 11, to decrease the angle of incidence of the ruddevators 3. Conversely, if the boom 1 swings upward the cables 31 will be wrapped around the lower portions of pulleys 33 sufficiently to cause clockwise turning of pulleys 30 and hence an increase in the angle of incidence of the ruddevators relative to the boom. If pulleys 33 are smaller than pulleys 30, the angular movement of the ruddevators will be less than the angle of swing of the boom 1, and consequently, some aerodynamic restoring force will be produced by the ruddevators, the amount depending upon the relative sizes of pulleys 30 and 33.

To superimpose upon this parallel movement balancing mechanism an elevational control movement of the ruddevators, it is merely necessary to rotate pulleys 33 simultaneously in the same direction and to the same degree, the direction of rotation determining whether the angle of incidence of the ruddevators will be increased or decreased. Such movement of pulleys 33 may be accomplished by fore and aft movement of the control column 55. If this control column is moved forward, that is, to the left in Figure 11, differential gearing 53 will be rotated as a unit to turn both quadrants 51 counterclockwise which will cause cable 50 to rotate both drive pulleys 5 clockwise. Since the casing of the differential gearings 37 will remain stationary, pulleys 36 in turn will be rotated counterclockwise, which will cause cables 34 to rotate pulleys 33 clockwise. Driven by cables 31, pulleys 30 also will be rotated clockwise to increase the angle of incidence of both ruddevators 3 equal amounts. An aerodynamic lift will thus be produced on the trailing portion of boom 1 to swing it upward.

Conversely, if the control column 55 is swung rearward, that is, to the right in Figure 11, the rotative direction of quadrants 51 and the other pulleys mentioned above will be reversed, so that the angle of incidence of ruddevators 3 will be decreased to produce an aerodynamic force for swinging the boom downward. Obviously, such control movement of column 55 may be accomplished without in any way interfering with the automatic vertical balancing function of pulleys 30 and 33 and cables 31.

The automatic lateral balancing function is accomplished by the lateral balancing mechanism rotating pulleys 33 in opposite directions and in equal amounts as the boom swings laterally while control column 55 is not swung laterally to rotate gear 54. The mechanism for accomplishing such lateral balancing action includes cables 34, guide pulleys 35, pulleys 36 and differential gearing 37, which elements are common to the elevational control mechanism described. Assuming that the control column 55 is held stationary, however, pulleys 5 will not be rotated, so that shafts 39 remain stationary. As the boom swings to starboard, for example, which would swing the yoke 20 carrying it in a counterclockwise direction, as viewed from above in Figures 10 and 11, the upper link 41 in Figure 11 would be shifted lengthwise to the left to swing its lever 4 clockwise, whereas the lower link 41 would be shifted lengthwise to the right to swing its lever 4 counterclockwise.

Bearing in mind that shafts 39 are held stationary, the clockwise swinging of upper lever 4 in Figure 11 will rotate the upper pulley 36 in that figure clockwise, whereas the swinging of the lower lever 4 in a counterclockwise direction will turn its differential gearing casing 40 to rotate the lower pulley 36 counterclockwise. Thus the clockwise rotation of the upper pulley 36 will rotate the left pulley 33 counterclockwise, and the counterclockwise rotation of the lower pulley 36 will rotate the right pulley 33 clockwise. Correspondingly, the upper pulley 30 will be turned counterclockwise to decrease the angle of incidence of its ruddevator, and the lower pulley 30 will be turned clockwise to increase the angle of incidence of its ruddevator.

The degree of such conjoint but opposite angular displacements of ruddevators 3 will, of course, depend upon the degree of rotation of arms 4, pulleys 36 and pulleys 33 for a given swing of boom 1 and corresponding rotation of yoke 20. For a given turn of this yoke the angular displacement of arms 4 may be varied by altering the length of lever arm of crossarm 23 acting on link 41, or the effective length of arms 4. Thus the locations of pivots 42 may be shifted from the positions shown in Figure 11 to holes 43 or, as shown in Figure 10, to holes 44 to increase correspondingly the angular movement of arms 4 and the change in angle of incidence of the ruddevators corresponding to a given angular displacement of the boom. If, when the pivots 42 of links 41 are engaged in holes 44, the angle of incidence of the ruddevators is changed sufficiently to eliminate entirely the restoring aerodynamic force, a small restorative force will be produced if the link pivots are engaged in holes 43, and a still greater restorative force will be produced when the links are pivoted at the innermost holes of arms 23, as shown in Figure 11.

While in describing the automatic lateral balancing operation it has been assumed that pulleys 5 remained stationary, it will be evident that they could have been rotated simultaneously through equal degrees at any time by fore and aft movement of the control column 55 without interfering with the differential movement of pulleys 36, accomplished by rotation of lever arms 4. In addition, lateral control movement of the control stick 55 may be superimposed upon the lateral balancing action of the mechanism described. This is accomplished by effecting rotation of pulleys 5 in opposite directions instead of both in the same direction.

Assuming that control stick 55 is not swung fore and aft, but only laterally, gear 54 will be turned to rotate one quadrant 51 in one direction and the other quadrant 51 in the opposite direction. This, in turn, will rotate pulleys 5 in opposite directions. If the differential gear casings 40 are not being rotated, pulleys 36 will be rotated in opposite directions. If the gear casings 40 are also being rotated in opposite directions, the opposite rotations of pulleys 36 will either be augmented or reduced so that their rotation becomes the algebraic sum of the rotation of pulleys 5 and arms 4. Such movements of pulleys 36 will be transmitted through cables 34 to pulleys 33, which in turn will effect corresponding changes in the angles of incidence of ruddevators 3.

It will be seen, therefore, that the automatic balancing control for elevational movement of the boom, the automatic balancing control for lateral swinging of the boom, and the manual control mechanism for effecting voluntarily both elevational and lateral swinging of the boom are all interconnected at all times, so that the changes in angles of incidence of the ruddevators reflect the integration of the action of the control mechanism and the two automatic balancing mechanisms to produce the desired boom swinging action characteristics. Vertical manual control of the boom is limited in opposite directions by the stop arm 56 engaging the stops 57 and 58, whereas lateral control movement is limited by the control column 55 engaging stops 59. Lateral swinging movement of the boom is limited positively by engagement of crossarm 23 with stops 24.

With mechanism described, therefore, the desired automatic balancing of the boom may be accomplished without in the least restricting the positive control of the operator over boom movement, although the limits of such control and of boom swinging are established by convenient stop mechanism.

We claim as our invention:

1. Mechanism for interconnecting aircraft in flight comprising a stiff boom, means universally and freely pivoting said boom directly to an aircraft in trailing attitude for swinging relative to such aircraft both upward and downward and laterally, air reaction control surfaces mounted movably on said boom, and balancing mechanism interconnecting the aircraft and said air reaction control surfaces and operable automatically to move said air reaction surfaces relative to said boom as said boom swings relative to the aircraft.

2. Mechanism for interconnecting aircraft in flight comprising a boom, means supporting said boom from an aircraft in trailing attitude for swinging relative to such aircraft, ruddevators pivoted, respectively, on opposite sides of said boom in positions projecting outwardly from opposite sides thereof and upwardly sufficiently to exert a substantial athwartships aerodynamic force, and balancing mechanism interconnecting the aircraft and said ruddevators and operable automatically to turn said ruddevators oppositely relative to said boom as said boom swings laterally relative to the aircraft.

3. Mechanism for interconnecting aircraft in flight comprising a boom, means supporting said boom from an aircraft in trailing attitude for lateral swinging relative to such aircraft, an air reaction control surface mounted movably on said boom and movable to produce an athwartships force on said boom, and balancing mechanism interconnecting the aircraft and said air reaction control surface and operable automatically to move said air reaction control surface relative to said boom, as said boom swings relative to the aircraft laterally out of a plane parallel to the flight path of the aircraft.

4. The mechanism defined in claim 3, and control means operable voluntarily to change the angle of attack of the air reaction control surface in any laterally-swung position of the boom.

5. Mechanism for interconnecting aircraft in flight comprising a boom, means supporting said boom from an aircraft in trailing attitude for swinging laterally relative to such aircraft, ruddevators pivoted respectively on opposite sides of said boom, and balancing mechanism interconnecting said aircraft and said ruddevators and operable automatically as said boom swings relative to the aircraft laterally out of a plane parallel to the flight path of the aircraft to turn said ruddevators in opposite directions.

6. The mechanism defined in claim 5, and manual control means operable voluntarily to modify the action of the balancing mechanism to effect turning of the ruddevators in opposite directions in varying degrees, thereby superimposing a voluntary control action on the balancing action of said balancing mechanism.

7. The mechanism defined in claim 6, including differential gearing mechanism having one gear operatively connected to a ruddevator, a second gear operatively connected to the balancing mechanism, and a third gear operatively connected to the manual control means to effect rotation of said first gear in response to integrated movement of said second and third gears.

8. Mechanism for interconnecting aircraft in flight comprising a boom, means supporting said boom from an aircraft in trailing attitude for swinging relative to such aircraft, both vertically and laterally, ruddevators pivoted respectively on opposite sides of said boom, and balancing mechanism interconnecting said aircraft and said ruddevators and operable automatically as said boom swings vertically relative to the aircraft to turn said ruddevators relative to said boom in the same direction, and further operable automatically as said boom swings laterally relative to the aircraft to turn said ruddevators in opposite directions.

9. The mechanism defined in claim 8, and manual control means operable voluntarily to modify the action of the balancing mechanism to move the ruddevators to different degrees for effecting voluntary vertical or lateral swinging of the boom or composite vertical and lateral swinging of the boom.

10. Mechanism for interconnecting aircraft in flight comprising a boom, means supporting said boom from an aircraft in trailing attitude for swinging relative to said aircraft, both vertically and laterally, air reaction control surfaces mounted movably on said boom, manual control means operable voluntarily to effect movement of said air reaction control surfaces, and means operatively interconnecting said manual control means and said air reaction control surfaces, and including balancing mechanism interposed between said manual control means and said air reaction control surfaces operable to move said air reaction control surfaces relative to the aircraft as said boom swings vertically and laterally relative to the aircraft, and controllable by said manual control means to modify the movement of said air reaction control surfaces.

11. The mechanism defined in claim 10, in which the balancing mechanism includes parallel motion mechanism for controlling movement of the air reaction control surfaces automatically during vertical swinging of the boom relative to the aircraft.

12. The mechanism defined in claim 10, in which the balancing mechanism includes differential gearing operable by lateral swinging movement of the boom to effect movement of the air reaction control surfaces as the boom swings laterally.

13. Mechanism for interconnecting aircraft in flight comprising a boom, a yoke journaled in the aircraft for rotation about an upright axis, and supporting said boom in trailing attitude for lateral swinging relative to the aircraft, an air reaction control surface mounted movably on said boom and movable to produce an athwartships force on said boom, and balancing mechanism carried by said aircraft operatively connected to said yoke and operatively connected to said air reaction control surface, and operable automatically by rotation of said yoke relative to the aircraft as said boom swings laterally relative to the aircraft to move said air reaction control surface relative to said boom in an amount corresponding to the rotation of said yoke relative to the aircraft.

14. The mechanism defined in claim 13, and adjustable means operatively connecting the balancing means and the yoke and adjustable to vary the movement of the balancing means effected by a given rotation of the yoke.

15. The mechanism defined in claim 13, and differential gearing means incorporated in the balancing mechanism, and link means connected to the yoke and operable to move said differential gearing means.

16. The mechanism defined in claim 15, and manual control means connected to the differential gearing means and operable to effect movement thereof for integration with the movement thereof effected by rotation of the yoke.

17. Mechanism for interconnecting aircraft in flight comprising a boom, a yoke journaled in the aircraft for rotation about an upright axis and supporting said boom in trailing attitude for swinging both laterally and vertically relative to the aircraft, ruddevators pivoted respectively on opposite sides of said boom, parallel motion balancing mechanism interconnecting said yoke and the ruddevators and operable automatically to turn the ruddevators simultaneously in the same direction to maintain substantially constant angle of attack as the boom swings vertically, lateral balancing mechanism including two differential gearing devices, link means interconnecting said respective differential gearing devices and said yoke, and means interconnecting said differential gearing devices and said parallel motion balancing mechanism and operable automatically by movement of said differential gearing devices, effected by rotation of said yoke relative to the aircraft as the boom swings laterally relative to the aircraft acting through said link means, to effect conjoint rotation of said ruddevators in opposite directions to decrease the angle of attack of the outboard ruddevator and to increase the angle of attack of the inboard ruddevator, and control means operable to move said differential gearing devices similarly to turn said ruddevators conjointly in the same direction and further operable to move said differential gearing devices oppositely to turn said ruddevators conjointly in opposite directions, for effecting voluntary vertical and lateral swinging of said boom, respectively.

18. Mechanism for interconnecting aircraft in flight comprising a stiff boom, means universally and freely pivoting said boom directly to an aircraft in trailing attitude for swinging relative to such aircraft both upward and downward and laterally, air reaction control surfaces mounted movably on said boom, and balancing mechanism interconnecting the aircraft and said air reaction control surfaces and operable automatically, as said boom swings in a given direction relative to the aircraft, to move said air reaction surfaces relative to said boom in directions for producing aerodynamic forces on said boom opposing such boom swinging.

19. Mechanism for interconnecting aircraft in flight comprising a boom, means supporting said boom from an aircraft in trailing attitude for swinging relative to such aircraft, ruddevators pivoted, respectively, on opposite sides of said boom in positions projecting outwardly from opposite sides thereof and upwardly sufficiently to exert a substantial athwartships aerodynamic force, and balancing mechanism interconnecting the aircraft and said ruddevators and operable automatically, as said boom swings laterally relative to the aircraft, to turn said ruddevators oppositely relative to said boom in directions producing additive athwartships forces acting toward the central longitudinal plane of the aircraft.

20. Mechanism for interconnecting aircraft in flight comprising a boom, means supporting said boom from an aircraft in trailing attitude for swinging upward and downward and laterally relative to such aircraft, two air reaction control surfaces mounted pivotally on said boom in positions projecting upwardly and outwardly from opposite sides thereof, means operable to rotate said control surfaces one in one direction and the other in the opposite direction to effect lateral movement of the trailing end of said boom, and balancing mechanism interconnecting the aircraft and said air reaction control surfaces and operable automatically to rotate said air reaction surfaces in the same direction relative to said boom as said boom swings upward or downward relative to the aircraft.

21. Mechanism for interconnecting aircraft in flight comprising a boom, means freely pivoting said boom on an aircraft in trailing attitude for swinging upward and downward relative to such aircraft, air reaction control surfaces projecting respectively from opposite sides of said boom and pivoted to turn about athwartships axes, parallel motion balancing mechanism interconnecting said aircraft and said air reaction control surfaces and operable automatically, as said boom is swung by air forces upward or downward relative to the aircraft, to turn said air reaction control surfaces relative to said boom conjointly in the same direction to maintain substantially constant angle of attack of said air reaction control surfaces, and boom swinging means operable to effect voluntary swinging of said boom relative to such aircraft including control means operable to change the angle of attack of the air reaction control surfaces and thereby effect such movement of said boom relative to such aircraft.

THOMAS DAVIS CASTOR.
CLIFFORD J. LEISY.
WILLIAM A. SANGSTER.

References Cited in the file of this patent

UNITED STATES PATENTS

| Number | Name | Date |
|---|---|---|
| 965,289 | Garsed | July 26, 1910 |
| 1,083,464 | Roche | Jan. 6, 1914 |
| 1,802,226 | Torkelson | Apr. 21, 1931 |
| 1,818,834 | Zimmerman | Aug. 11, 1931 |
| 1,848,372 | Moran | Mar. 8, 1932 |
| 1,867,902 | Weaver | July 19, 1932 |
| 2,122,778 | Mueller | July 5, 1938 |
| 2,124,867 | Akerman | July 26, 1938 |
| 2,198,893 | Van Waveren | Apr. 30, 1940 |
| 2,257,940 | Dornier | Oct. 7, 1941 |
| 2,421,437 | Ryan et al. | June 3, 1947 |